United States Patent
Vesterinen et al.

(10) Patent No.: US 9,648,519 B2
(45) Date of Patent: May 9, 2017

(54) DEVICES, METHODS AND COMPUTER PROGRAM PRODUCTS FOR AN IMPROVED HANDOVER IN INTER-SITE CARRIER AGGREGATION SCENARIOS

(75) Inventors: Seppo Ilmari Vesterinen, Oulunsalo (FI); Johanna Katariina Pekonen, Espoo (FI); Henri Markus Koskinen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 175 days.

(21) Appl. No.: 14/388,363

(22) PCT Filed: Mar. 30, 2012

(86) PCT No.: PCT/EP2012/055837
§ 371 (c)(1),
(2), (4) Date: Sep. 26, 2014

(87) PCT Pub. No.: WO2013/143610
PCT Pub. Date: Oct. 3, 2013

(65) Prior Publication Data
US 2015/0055620 A1    Feb. 26, 2015

(51) Int. Cl.
*H04W 36/00* (2009.01)
*H04W 36/24* (2009.01)
(Continued)

(52) U.S. Cl.
CPC ......... *H04W 36/0005* (2013.01); *H04L 5/001* (2013.01); *H04L 5/0091* (2013.01);
(Continued)

(58) Field of Classification Search
CPC ............. H04W 72/0453; H04W 92/20; H04W 36/0005; H04W 36/24; H04W 36/0061;
(Continued)

(56) References Cited

U.S. PATENT DOCUMENTS

| | | | | |
|---|---|---|---|---|
| 2010/0317344 A1* | 12/2010 | Dalsgaard | ............. | H04W 74/02 455/436 |
| 2012/0202501 A1* | 8/2012 | Morioka | ........... | H04W 36/0072 455/436 |
| 2014/0342738 A1* | 11/2014 | Ishii | ...................... | H04W 28/08 455/436 |

FOREIGN PATENT DOCUMENTS

GB    2472789 A    2/2011
GB    2479534 A    10/2011
(Continued)

OTHER PUBLICATIONS

3GPP TR 36.814 V9.0.0 (Mar. 2010); 3rd Generation Partnership Project; Technical Specification Group Radio Access Network; Evolved Universal Terrestrial Radio Access (E-UTRA); Further advancements for E-UTRA physical layer aspects (Release 9), (104 pages).

*Primary Examiner* — Kwang B Yao
*Assistant Examiner* — Moo Ryong Jeong
(74) *Attorney, Agent, or Firm* — Harrington & Smith

(57) ABSTRACT

A device communicates with a terminal in association with at least a first other device, using at least two carriers, wherein at least a first carrier towards the terminal is established from the device and at least a second carrier is established towards the terminal from the first other device. The device receives a report indicative of a connection quality of the first carrier, responsive thereto issues a request for handover of the first carrier towards a second device, sends relocation information in relation to the first carrier towards the first other device, and only after sending that relocation information, commands the terminal to perform a handover of the first carrier to the second device. Such device, in cooperation with other devices, accomplishes an optimized handover in terms of a primary component carrier relocation from a serving eNB towards a target eNB, while a secondary component carrier is maintained.

20 Claims, 3 Drawing Sheets

(51) Int. Cl.
  *H04L 5/00* (2006.01)
  *H04W 36/30* (2009.01)
  *H04W 72/04* (2009.01)
  *H04W 36/18* (2009.01)
  *H04W 92/20* (2009.01)

(52) U.S. Cl.
  CPC ....... *H04L 5/0098* (2013.01); *H04W 36/0061* (2013.01); *H04W 36/0072* (2013.01); *H04W 36/18* (2013.01); *H04W 36/24* (2013.01); *H04W 36/30* (2013.01); *H04W 72/0453* (2013.01); *H04W 92/20* (2013.01)

(58) Field of Classification Search
  CPC . H04W 36/0072; H04W 36/30; H04W 36/18; H04L 5/001; H04L 5/0091; H04L 5/0098
  See application file for complete search history.

(56) References Cited

FOREIGN PATENT DOCUMENTS

| | | |
|---|---|---|
| WO | WO 2011/100492 A1 | 8/2011 |
| WO | WO 2011/111973 A2 | 9/2011 |

\* cited by examiner

DEVICES, METHODS AND COMPUTER PROGRAM PRODUCTS FOR AN IMPROVED HANDOVER IN INTER-SITE CARRIER AGGREGATION SCENARIOS

FIELD OF THE INVENTION

The present invention relates to devices, methods and computer program products for an improved handover in inter-site carrier aggregation scenarios. In particular, the present invention relates to such devices, methods and computer program products applicable in mobile communication systems operating based on carrier aggregation, in which a primary cell/carrier is relocated during a handover in an inter-site carrier aggregation scenario.

BACKGROUND

Mobile data transmission and data services are constantly making progress. With the increasing penetration of such services, a terminal apparatus such as a user equipment UE (or mobile station MS, or the like; different names may apply for respective different standards) is capable of communicating using multiple frequencies or frequency bands and accessing various services. Data throughput is becoming more and more important in view of an increasing amount of data to be conveyed or carried for those services. According to one aspect to increase data throughput, a terminal UE is supplied or served from e.g. plural sources (sites) (e.g. bases stations BS or NodeB's, NB or evolved NodeBs, eNB) using plural carriers in carrier aggregation (CA). This is also referred to as inter-site carrier aggregation if the carriers are provided via distinct sites (in contrast to intra-site carrier aggregation in which one site, e.g. eNB, aggregates the plural carriers "alone").

In the following, aspects of the invention will be exemplarily described. In order to enhance legibility and understandability of the invention, for explanatory purposes only, reference is made to the communication system of LTE or LTE-A (Long Term Evolution, LTE-Advanced). However, reference to such specific system and using of specific signalling names or channel names is not intended to limit the present invention to those specific examples. Rather, the principles of the present invention can be transferred to any other communication system adopting different channel/signalling names as LTE/LTE-A.

Along with the development of LTE system, high-speed data service has been treated as one of the most important requirements. Especially for local area network, higher data rate is expected from user's perspective. How to provide local service with high speed data rate has become a hot topic in 3GPP ($3^{rd}$ Generation Partnership Project).

LTE-LAN (LTE-Local Area Network) is a research activity to compete with world-wide popular WiFi© or WLAN (Wireless Local Area Network) technique. LTE-LAN is basically assumed to be based on LTE technology, but is more focused on some local area use cases and scenarios. LTE-LAN is expected to provide high performance service for users with low cost, and is expected to become a competitor to WiFi©.

Applicant is involved in investigating in such area, with a focus on potential LTE local area architectures as one of plural research topics. One of the most promising local area concepts identified in such preliminary works is the architecture based on the LTE-LAN (which is currently referred to as "LTE Hi-concept").

Basic assumptions in this concept are:
Dual band operation in that local area and wide area accesses are using different radio bands,
Autonomous (local area) operation to mobile core network in that the usage of LTE-LAN network is transparent to a core network for simplicity and for keeping the signaling load low,
Offloading of LTE wide area network resources (EPS (Evolved Packet System) Bearer Services) to use LTE-LAN network resources in control of the serving eNB of the UE at E-UTRAN level (Evolved Universal Terrestrial Radio Access Network).

At the moment, in 3GPP Rel-12 and above there is also some interest in studying Inter-Site Carrier Aggregation with LTE, where a Primary Component Carrier (PCC PCell or primary Cell) is transmitted via e.g. a macro eNB (PCell or primary Cell) and one or more Secondary component carrier (SCCs, SCells or Secondary Cells) is transmitted via e.g. one or more pico cell(s) (representing a SCell or Secondary Cell). Note that as used herein below 'PCell/eNB' is designated to denote a primary eNB and 'SCell BS' is designated to denote a secondary base station, and so on, as also the primary node may provide also SCells in Rel-10 fashion alongside those provided from the secondary node(s). Thus, there is only one Pcell for the UE. Apart from that, any base station can transmit several SCells to that UE. "Inter-site" thus means that at least one SCell is not co-sited with the PCell.

In general, the mentioned "LTE-Hi concept" may support Inter-Site and "multi-radio" CA, where a serving eNB is in a role of a primary cell, PCell, and "LTE-Hi" Access Points (APs) are each in a role of a respective secondary cell, SCell.

In the LTE-LAN or Inter-Site CA concepts targeted for 3GPP Rel-12, a terminal UE may move within the network coverage, so that there may be situations in which a current SCell (the pico cell or the LTE-LAN AP) has proper signal but the Serving macro eNB or the PCell is not any longer anymore the best cell. This will necessitate in an Inter eNB handover/PCell Relocation procedure to be carried out.

Though, so far in the context of Inter Site CA studies, there have not been any discussions known by the inventors about such a scenario, because the CA scenario considered in 3GPP so far are assuming PCell and SCell being controlled by the same eNB (Intra-site CA).

In 3GPP standardization, the Inter Site Carrier Aggregation is not supported before to the coming Rel-12 due to an assumption that a backhaul link (the X2 interface) between eNBs has constrains in terms of latency and capacity (3GPP TR 36.814). For such reason, inter-site CA remained unconsidered (omitted) so far.

A reason for this is that the current Intra Site Carrier Aggregation is supposed to happen at the radio link layer (below RLC in LTE radio stack), so that the fast radio control loop on all the CCs must be terminated at the primary eNB (PCell/eNB). Thus, it has not been feasible to consider relocation of only a subset of a UE's serving cells so far, but CA mobility is assumed to be handled by removing/adding secondary CC(s) in conjunction with Inter PCell handover procedures, i.e. (at first) terminate CA operation temporarily (terminate any secondary carriers/cells) and then, if possible, restart CA and the secondary carriers/cells after the PCell handover was executed.

Thus, carrier aggregation is not maintained during inter-site HO, an increased signaling load is involved to terminate/restart the secondary carriers/cells, and it is unsure whether the SCCs/SCells can be reactivated after HO.

Thus, there is still a need to further improve such systems in relation to handover in inter-site carrier aggregation scenarios, and hence a need to provide improved devices, methods and computer program products for a corresponding handover procedure for inter-site carrier aggregation scenarios.

SUMMARY

Various aspects of examples of the invention are set out in the claims.

According to a first aspect of the present invention, there are provided respective devices as defined in claims 1, 5, and 7.

According to a second aspect of the present invention, there are provided respective devices as defined in claims 8, 12, and 14.

Advantageous further developments of the respective devices/methods are as set out in respective dependent claims.

According to a third aspect of the present invention, there are provided computer program products, as defined in claims 15 to 17, comprising computer-executable components which, when the program is run on a computer, are configured to perform the method aspects as indicated above. The above computer program product/products may be embodied as a computer-readable storage medium.

It is thus proposed, according to at least exemplary aspects of the invention, a new procedure and correspondingly configured devices which is/are at least beneficial in regard to the following:

- an Inter-Site eNB handover/PCell relocation is enabled such that a secondary eNB can remain configured to provide one or more SCells towards the UE (after HO) without interruption;
- the procedure for PCell Relocation enables to maintain the configuration of serving cells provided by the secondary eNB unaltered, like e.g. shown in the FIG. 1;
- the procedure supports relocating the "associated macro eNB" (PCell) while a terminal UE has dual-radio connectivity by using LTE and LTE-LAN radio;
- the procedure/architecture supports a primary eNB to control the resources of a secondary eNB and to pass user-plane data accordingly via a common interface between a primary eNB and Local Area Access Point, the interface representing a backhaul interface supporting X2/S1 like functions;
- the presented PCell relocation procedure is for example particularly feasible in Inter-Site Carrier Aggregation by using Carrier Aggregation where data flows are split already at Layer Three i.e. in between RLC and PDCP in the LTE radio stack, like for example shown in FIG. 2;
- the active backhaul interface can be switched in such scenario to its new route from a secondary/LA BS to a new (target) macro eNB without altering the radio secondary component carrier (CC) connection in between the UE and a secondary base station;
- the radio handover from the source PCell to the target PCell and the said backhaul-interface path switching is time-organized so that the procedure is seamless without causing packet loss, un-necessary delay or service worsening.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Exemplary aspects/embodiments of the invention will be described herein below.

For better understanding of subsequent aspects of the invention, it is noted that in his projects, applicant has already made a couple of associated macro eNB relocation procedure proposals. Those are or were based on an assumption that a handover on the primary radio connection and the macro eNB-LTE-LAN AP backhaul interface path switching for the secondary connection should be executed in two phases, i.e. assuring first that the inter macro eNB (PCell in CA) handover is executed successfully, and only after that perform the said backhaul interface path switching for the "secondary carrier" for possible offloaded or aggregated EPS bearers.

This is a quite natural initial thinking as the primary radio connection via the PCell is seen more important to be maintained also in the failure cases, and one easily concludes to make a trade between robustness and overall performance.

However, here it should be noted that such two phase procedure does not increase robustness in case an Inter PCell handover failure will occur. This is because the terminal UE may have no possibility to return back to the source PCell/eNB in which radio link quality was fading. Rather, it must perform a new RRC-connection/Service Request procedure to the best received Cell, and previous "old" UE context data become deleted in the source primary eNB (PCell/eNB). Then, after an Inter-eNB1 handover failure, the source PCell simply cannot continue serving the former "secondary carrier(s)" and thus the robustness does not become any better by using the proposed two phase solution.

In applicant's conceptual work, there is assumed Inter-Site CA, with data split among the sites done within the air-interface protocol stack, and where a fast radio control loop for the secondary carrier component is terminated at the secondary base station. This L3 based multi-radio solution enables less stringent latency requirement in the backhaul between the primary and the secondary base stations in order to support Inter Site CA.

The subsequently outlined newly proposed PCell relocation procedure is particularly feasible in the context of Inter Site Carrier Aggregation, where data flow split happens already at Layer Three (L3), i.e. in between RLC and PDCP in the LTE radio stack like shown in FIG. 2. Though, this is not a pre-requisite for the proper functioning of the example embodiments of the present invention.

Figure 2:
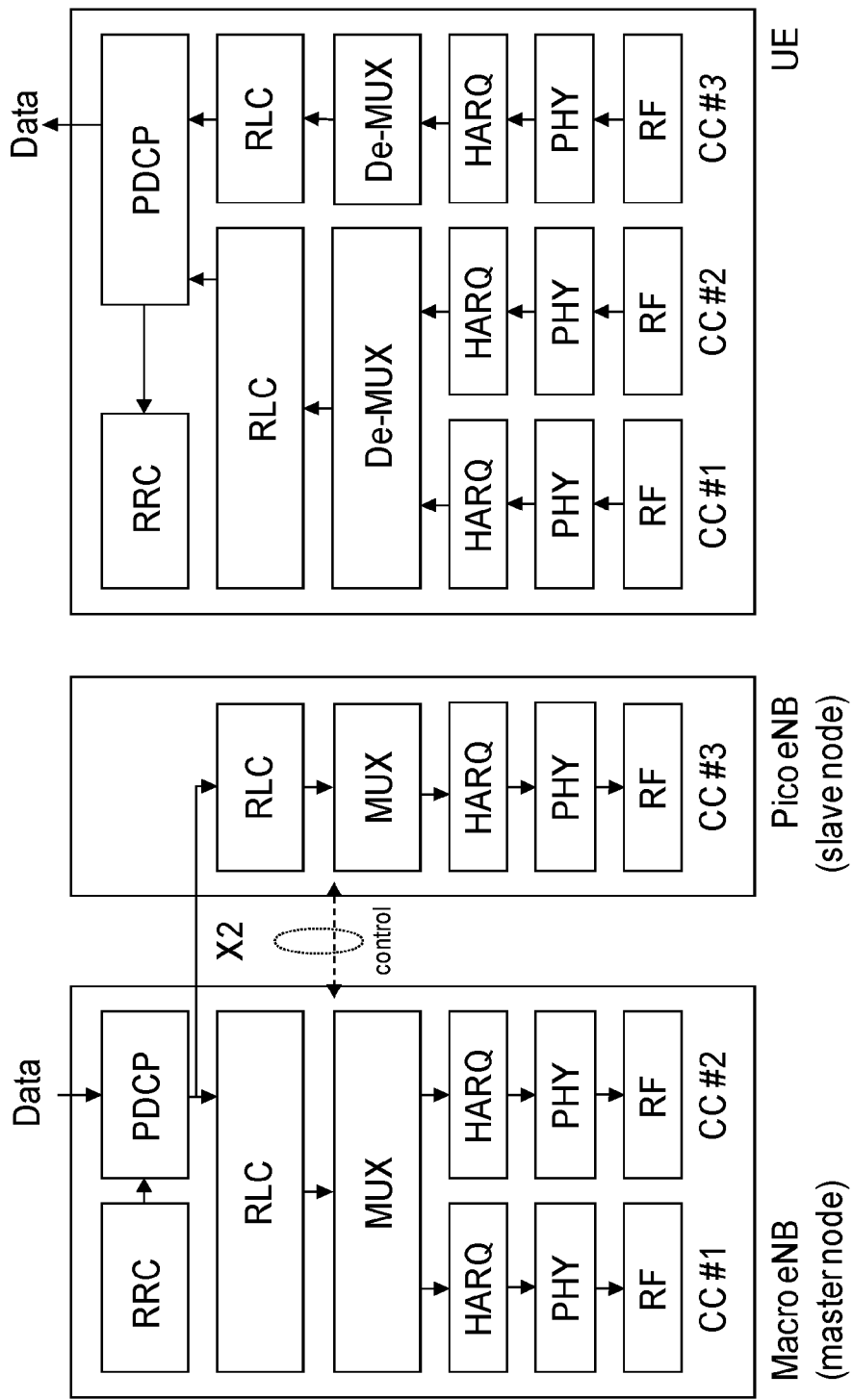
FIG. 2 illustrates radio-protocol stacks in inter-site carrier aggregation with a flow splitting at Layer 3.

FIG. 2 shows a master node (serving eNB incl. primary CC), a slave node (secondary eNB incl. secondary CC), and a terminal UE. For substantially each of those nodes, the protocol stack comprises: the packet data convergence protocol, PDCP, at which data are received (for the master node), and below which the data are split prior to being supplied to radio link control, RLC. Below RLC normal LTE MAC-protocol functionality takes place i.e. multiplexing MUX is performed and data are supplied to the hybrid automatic repeat request HARQ stack level, followed by the physical layer PHY, the rafio frequency RF part, which establishes the respective component carriers CC. Control data between master and slave node are exchanged via X2 interface over the X2AP protocol, independent from the shown air-interface protocol stack. Substantially the same applies for the terminal UE, with the exception that downlink data flow through the stack levels is reversed, and e.g. multiplexing is replaced by de-multiplexing, and data flow splitting is replaced by data flow combining at layer three, i.e. between RLC and PDCP.

In the LTE-LAN and Inter Site CA concepts, it is common that the Serving eNB and the secondary eNB or base station have a backhaul interface supporting X2/S1 like functions in order to let the master node control or at least request for the slave node's resources and to pass user-plane data accordingly.

Figure 1:
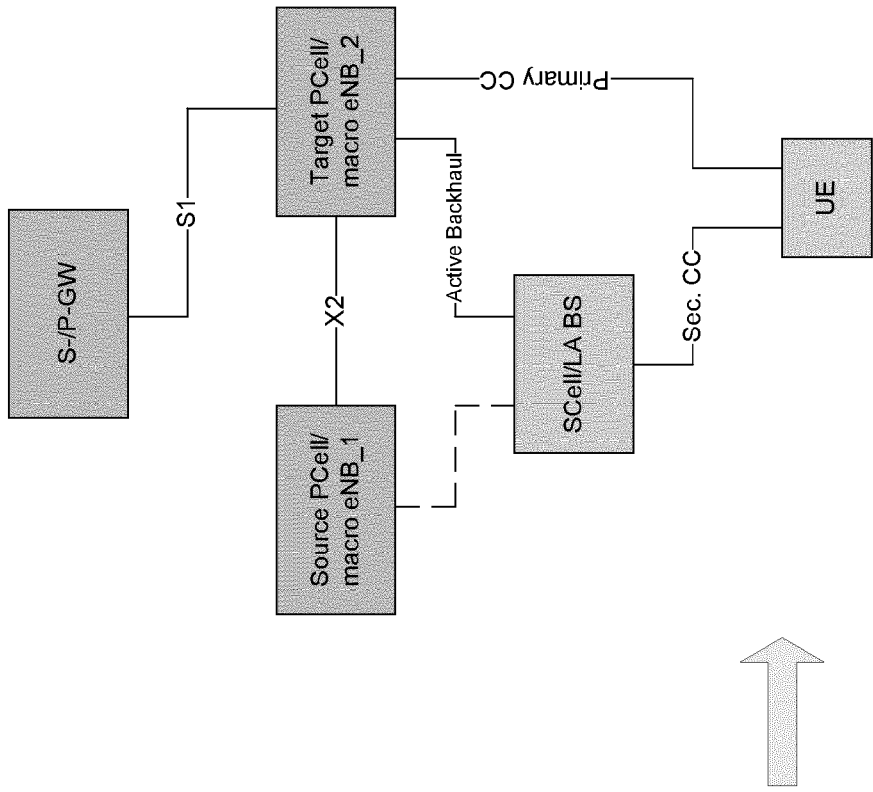
FIG. 1 illustrates a scenario of inter-site carrier aggregation and the entities/interfaces involved prior to (FIG. 1 a) and after (FIG. 1b) handover.
Figure 1:
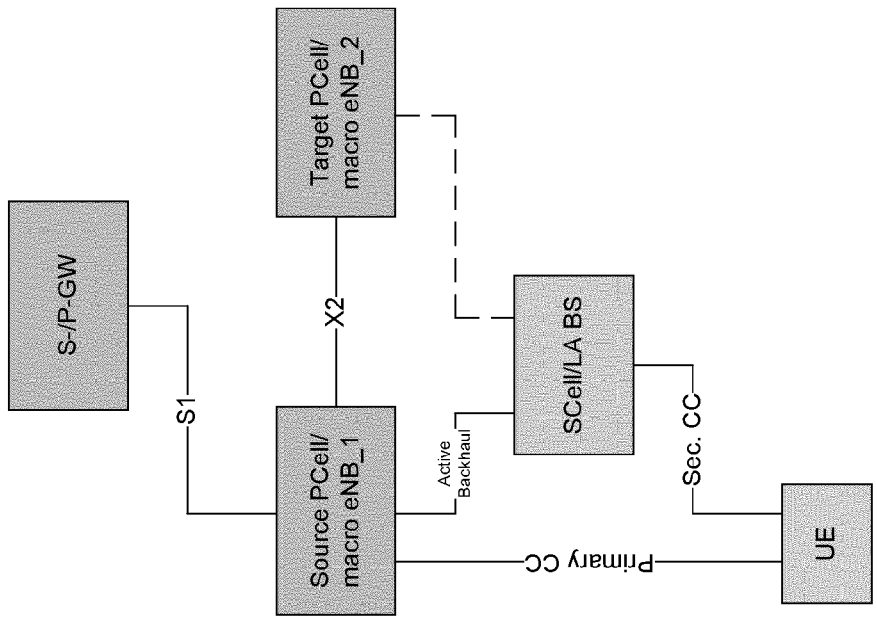

FIG. 1 illustrates a scenario of inter-site carrier aggregation and the entities/interfaces involved prior to (FIG. 1 a) and after (FIG. 1b) handover. Entities or apparatuses involved are as follows for FIGS. 1a and 1b.

A terminal UE, a source/primary cell eNB such as e.g. a macro eNB #1, a secondary eNB or base station such as e.g. a pico eNB, and a target/primary cell eNB such as a macro eNB #2.

The terminal in CA mode has established a primary component carrier PCC towards the serving eNB (eNB#1 before HO, eNB#2 after HO), and at least one secondary component carrier SCC towards secondary eNB or base station. The secondary cell/local access point eNB has a backhaul interface towards each of the (potential) primary cell eNBs. The backhaul interface towards the serving primary eNB is denoted as active backhaul interface. The (potential) primary cell eNBs #1 and #2, respectively, interface each other via an X2 interface.

As shown in FIG. 1b, after (and during) HO, the secondary component carrier SCC from the terminal remains the same towards the secondary cell/local access point eNB as before HO. However, the active backhaul interface from the secondary eNB has changed to be the one towards the new serving primary, i.e. target eNB #2, denoted as active backhaul interface in FIG. 1b.

The invention is implemented in, at least under an exemplary aspect, an apparatus such as an eNB, and comprises a device according to an aspect of the invention. Such device can be a chip or chipset, or a subunit of the apparatus, or the like. The device comprises at least a memory module, MEM, in which software code portions and/or data is stored or are stored. The memory module is connected to a control module ctrl such as a processor, or CPU, or ASIC. The control module is connected to a transceiver module. The transceiver module is configured for communication via the respective RAT and/or frequency band, i.e. configured for the associated service such as LTE, LTE-A with the UE. Such "eNB" may for example be represented by a macro eNB, a pico eNB and/or an LTE-LAN base station (BS).

Note that under an implementation aspect of the invention that is software "centric" rather than hardware "centric", respective modules may even be implemented as corresponding functional means (and without departing from the gist of the invention).

Note that herein below aspects of the invention are described with a focus on a source eNB (serving primary eNB prior to handover) as well as with a focus on a target eNB (serving primary eNB after handover). This, however, serves to keep the explanation simple. It is to be understood that in practice, each eNB (e.g. macro eNB) may take the role of a source as well as of a target eNB. Thus, it is to be understood that a device such as a eNB comprises/unites both functionalities at a time, as its role may change over time. Moreover, it may take both roles at a time, as an eNB may be a source eNB for a first terminal, e.g. user equipment UE1, but simultaneously may be a target eNB for another terminal, e.g. ser equipment UE2.

Under a primary eNB/PCell aspect, an eNB represents a device, comprising a control module configured to control a communication module, the communication module being controlled to communicate with a terminal UE in association with at least a first other device (i.e. a secondary eNB), using at least two carriers (PCC and SCC), wherein at least a first carrier (PCC) towards the terminal is established from the device (primary eNB) and at least a second carrier (SCC) is established towards the terminal from the first other device (secondary eNB or base station).

Under a target eNB/Pcell aspect, an eNB represent a device, comprising a control module configured to control a communication module, the communication module being controlled to communicate with a terminal UE in association with at least a first other device (i.e. a secondary eNB), using at least two carriers (PCC and SCC), wherein at least a first carrier towards (PCC) towards the terminal is to be established (during HO) from the device, and at least a second carrier (SCC) is established towards the terminal from the first other device (secondary eNB or base station)

Under a secondary eNB (or secondary base station) aspect, such an eNB represents a device, comprising a control module configured to control a communication module, the communication module being controlled to communicate with a terminal UE in association with at least another device (source or target primary eNB), using at least two carriers (PCC, SCC), wherein at least a first carrier (PCC) towards the terminal UE is established from the at least one another device (serving or target primary eNB) and at least a second carrier (SCC) is established towards the terminal UE from the device; and an interface towards said another devices, i.e. a backhaul interface to each of a source and target primary eNBs.

Now, method aspects in relation to such apparatuses or devices will briefly be outlined below and with reference to FIG. 3. The method can be implemented using computer program products and/or software code portions executed by the control modules of the devices, which when execute perform those method steps.

Figure 3:
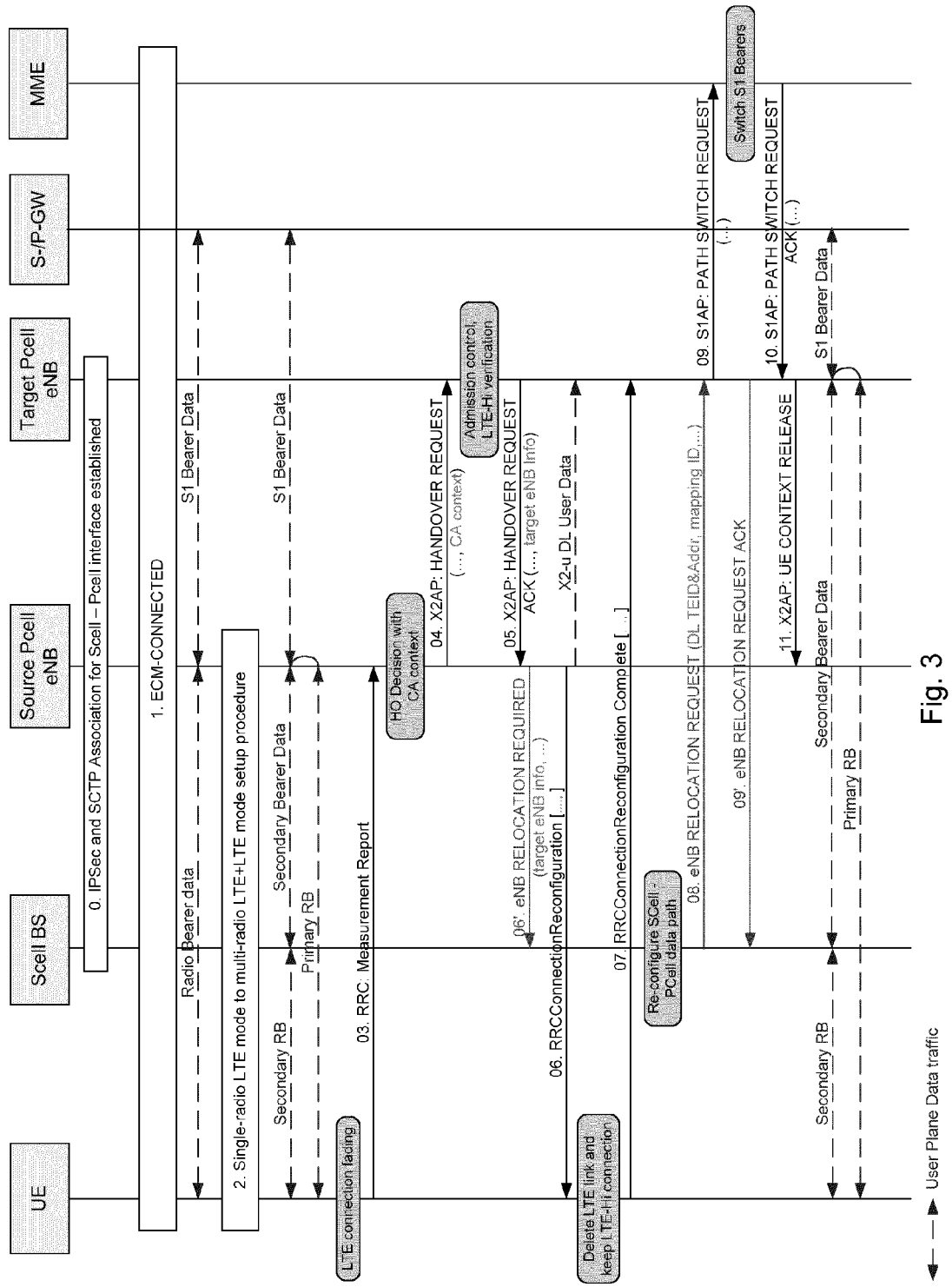
FIG. 3 illustrates an example of a signaling for a PCell relocation procedure with carrier aggregation service continuation.

The entities involved and depicted in FIG. 3 are those as explained with reference to FIG. 1 already. Signaling exchanged is illustrated with the horizontal arrows, time/sequence of signaling is reflected by the vertical arrangement of the signals exchanged, and processing performed at a respective entity or apparatus is indicated in "boxes" allocated on the timeline of the respective entity.

The following signaling flow diagram in FIG. 3 illustrates an example implementation of an optimized relocation procedure of a PCell in Inter Site Carrier Aggregation and Local Area offloading, where the ongoing secondary radio path services via the secondary base station will be continued alongside the target primary eNB. The proposed simultaneous data-path handling in LTE-Radio Handover and SCell-PCell backhaul path switching between the secondary and primary base stations provides the best performance and no or at least a shortest possible service break if Inter Site carrier aggregation is used.

In order to provide accurate synchronization, the primary eNBs measure and store the average transport delay of the backhaul interface between the secondary and primary base station. This is for example accomplished by using a Ping utility directed to the IP address of the secondary base station(s). (Note that each entity (apparatus or node) in such scenario is identifiable and addressable by an IP (internet Protocol) address associated thereto.)

In step 0, there are in advance established an IPSec and SCTP Associations for the SCell-PCell backhaul interfaces, i.e. secondary Base Station is prepared to have backhaul interfaces to multiple primary base stations.

In step 1, an evolved packet system connection management, ECM, is set up into connected state.

In step 2, the UE is moved to Inter Site Carrier Aggregation mode, i.e. there is a PCell via the primary base station and at least one SCell via the secondary base station.

In step 3, UE is sending a measurement report to the primary eNB, with an indication that the primary CC radio connection is fading, which results in that primary eNB makes Inter eNB handover decision. And as a secondary CC is working well, it also decides to continue CA via the target primary eNB.

In step 4, a Message 4, Handover Request is used to deliver the required information in order to continue CA operation via the target eNB. For example, such message in step 4 includes secondary BS Identifier, based on which a target eNB is able to verify connectivity and respond accordingly to the source eNB in a subsequent message in a step 5. The message in step 4, for example, optionally also contains UE measurement results of an SCell, based on which the target eNB may verify if the SCell is working well enough in order to continue the CA operation. Now, if the target eNB cannot continue offloading/carrier aggregation, it configures all E-RABs (evolved Radio Access Bearers) into normal LTE single radio mode, and the source eNB issues a resource release request to the secondary base station. The target primary eNB prepares itself to receive the UE in handover and in addition to the current standardized information, it returns in step 5 in a message "Handover Request Ack" the required "target eNB Info", in order to enable the secondary BS to switch its backhaul interface towards the target primary eNB.

Upon reception of the message in step 5, the Source primary eNB sends first the message 6' to the secondary base station, and only thereafter then sends the message 6, delayed according to the current measured backhaul delay value, to the UE as an explicit radio handover command (for the UE) to the target PCell.

In this handover command, the UE is informed that the SCell configuration specific to the secondary base station remains despite the new PCell (i.e. the RRC is switched to a new eNB, but the User plane remains same through the SCell(s) of the secondary base station).

In an example embodiment of this invention, it is encompassed that in addition and prior to the message 6, the Source primary eNB has also sent message 6' in order to command the secondary BS to perform backhaul interface path switching between the primary base stations timely aligned with said radio handover. Among other information, the message 6' contains the mentioned "target eNB Info" which is required for the backhaul interface path switching in uplink direction in the secondary BS.

In a message 7, the UE indicates to the target primary eNB the handover/relocation type (i.e. "the PCell relocation while certain SCell configuration remains"). In a similar manner like message 7 indicates successful UE movement to target PCell/eNB, the secondray BS sends message 8 to indicate that a new Backhaul interface between primary and secondary base stations is to be established. This message 8 contains at least the required information to setup the downlink direction connectivity over the backhaul accordingly.

The target primary eNB sends message 9 to the Secondary base station in order to indicate successful relocation procedure.

Thereafter, the inter site CA operation can continue via the target PCell/eNB by using new primary CC and intact secondary CC via the secondary base station.

The remaining steps of the signaling flow are as usual in the X2 based handover. It should be noted that message 9' may return NAK (negative acknowledgement, Non-ACK) in case UE has not moved to the target PCell/eNB, i.e. a handover failure has happened. In such case, the Secondary base station may release CC resources locally.

The present scenario according to FIG. 3 is optimized to full extent, provides lossless packet delivery by using data forwarding in case of acknowledged-mode (AM) bearers, and enables reliable recovery from LTE Handover failure. As a result there is no tradeoff or compromise between performance versus robustness when compared with the basic X2-interface based Inter eNB Handover.

Thus, from the above it is understood that according to at least those aspects as outlined above, the present invention proposes an optimized relocation procedure of a primary eNB (PCC) in Inter Site Carrier Aggregation and Local Area offloading, where the ongoing secondary radio path services via the secondary BS will be continued in the target primary eNB, and will not be interrupted during PCC relocation (handover). In this context it is to be noted that the secondary radio link between the UE and secondary BS/eNB remains intact, i.e. only the backhaul interface is switched from SCell to the target PCell/eNB (which will become the new serving cell after HO/relocation).

Characteristic to at least an aspect of this relocation procedure is that it timely aligns the execution of the X2 based Inter PCell/eNB Handover and backhaul interface path switching for the secondary connection via the SCell, i.e. these occur synchronized in a single phase, in order to seamlessly continue inter site Carrier Aggregated services in the target PCell/eNB.

Also, according to an aspect of the proposed procedure, such relocation procedure includes the Carrier Aggregation related context data transfers over the X2 interface between the source PCell/eNB and the target PCell/eNB, and control signaling over the backhaul interfaces between PCells and the SCell, thus managing the timely aligned sequences. Additionally, according to an aspect, it is proposed to inform in the Radio resource configuration signaling served UE and the target PCell/eNB about the relocation type (i.e. the PCell relocation while SCell configuration remains).

In addition to proper timely alignment, an aspect of the present invention also encompasses usage of data forwarding over the "old" backhaul interface between the SCell and the source PCell/eNB, and further over the X2 interface between the Source PCell/eNB and the (new) target PCell/eNB, in order to provide a lossless relocation procedure.

Embodiments of the present invention may be implemented in software, hardware, application logic or a combination of software, hardware and application logic. The software, application logic and/or hardware generally reside on a memory module. A memory module may be a volatile or non-volatile memory module, such as a RAM, ROM, EPROM, EEPROM, or hard disk, or the like. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

The present invention relates in particular but without limitation to mobile communications, for example to environments under LTE, LTE-A, and subsequent releases thereof and can advantageously be implemented in user equipments or smart phones, or personal computers connectable to such networks.

That is, it can be implemented as/in chipsets to connected devices, and/or modems thereof. More generally, all products which are subject to a similar environment will see performance improvement with the invention being implemented thereto.

If desired, the different functions discussed herein may be performed in a different order and/or concurrently with each other. Furthermore, if desired, one or more of the above-described functions may be optional or may be combined.

Aspects of the invention as described above encompass an optimised relocation procedure of a PCell/eNB in Inter Site Carrier Aggregation and Local Area offloading, where the ongoing secondary radio path services via the SCell will be continued in the target PCell/eNB. The secondary radio link between the UE and SCell remains intact, i.e. only the backhaul interface is switched from SCell to the target PCell/eNB. Characteristic to this relocation procedure is that it timely aligns the execution of the X2 based Inter PCell/eNB Handover and backhaul interface path switching for the secondary connection via the SCell i.e. these happen synchronized in one (single) phase in order to seamlessly continue inter site Carrier Aggregated services in the target PCell/eNB.

In individual aspects thereof, the invention proposes an optimized inter-site CA PCell handover procedure, while keeping the SCell eNB connection active (i.e. the ongoing secondary radio path services via the Scell will be continued in the target PCell/eNB) which comprising transfer the CA context to the target eNB, instruction of the Scell to switch the path to the target Pcell, indication to the UE and target node for the relocation, alignment of the HO sequence for Pcell and Scell. A particular aspect resides in that the Pcell is being subjected to HO first, and then once the UE and target node have received the needed request, the SCell is switched. This involves an optimized timely aligned radio HO and backhaul path switching with related messaging.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The present invention proposes a device, comprising a control module configured to control a communication module, the communication module being controlled to communicate with a terminal in association with at least a first other device, using at least two carriers, wherein at least a first carrier towards the terminal is established from the device and at least a second carrier is established towards the terminal from the first other device; and wherein the control module is configured to receive of a report indicative of a connection quality of the first carrier, responsive thereto a issue a request for handover of the first carrier towards a second device, send a relocation information in relation to the first carrier towards the first other device, and only after sending that relocation information, command the terminal to perform a handover of the first carrier to the second device. Such device, in cooperation with other devices, accomplishes an optimized handover in terms of a primary component carrier relocation from a serving eNB towards a target eNB, while a secondary component carrier is maintained.

LIST OF EXEMPLARY
ABBREVIATIONS/ACRONYMS USED

3GPP 3$^{rd}$ Generation Partnership Project
AP Access Point
BS Base Station
CA Carrier Aggregation
CC Component Carrier
eNB enhanced NodeB
EPC Evolved Packet Core
EPS Evolved Packet System
EUTRAN Evolved UMTS Terrestrial Radio Access Network
HeNB Home enhanced NodeB
HW Hardware
ID Identity
IP Internet Protocol
IPSec IP Security
LA Local Area
LTE Long Term Evolution
LAE Local Area Evolution
LAN Local Area Network
MME Mobility Management Entity
NB NodeB
PCell Primary Cell
PDCP Packet Data Convergence Protocol
PLMN Public Land Mobile Network
SCell Secondary Cell
UE User Equipment
MS Mobile Station
WLAN Wireless Local Area Network
CATR China Academy of Telecommunication Research
MIIT Ministry of Industry and Information Technology (China)
ERAB Evolved Radio Access Bearer

What is claimed is:

1. A device, comprising
a control module configured to control a communication module,
the communication module being controlled to communicate with a terminal in association with at least a first other device, using at least two carriers, wherein at least a first carrier towards the terminal is established from the device and at least a second carrier is established towards the terminal from the first other device;
and wherein the control module is configured to
receive a report indicative of a connection quality of the first carrier,
responsive to the receiving of the report indicative of the connection quality of the first carrier, issue a request for handover of the first carrier towards a second device,
send a relocation information in relation to the first carrier towards the first other device, and only after sending that relocation information, command the terminal to perform a handover of the first carrier to the second device.

2. A device according to claim 1, further comprising
an interface towards said at least first other device,
a measurement module configured to measure an average transport delay for data that are exchanged between the device and said at least first other device via said interface, wherein
the control module is configured to
delay the command to the terminal after sending the relocation information according to the measured transport delay.

3. A device according to claim 2, wherein
the measurement module is configured to measure transport delay based on a Ping procedure directed to address of a respective first other device.

4. A device according to claim 1, wherein
the control module is configured to
include, in said request for handover, information indicative of the first carrier established towards the terminal and of the at least second carrier established towards the terminal from the first other device.

5. A method, comprising
communicating by a device with a terminal in association with at least a first other device, using at least two carriers, wherein at least a first carrier towards the terminal is established from the device and at least a second carrier is established towards the terminal from the first other device;
receiving at the device of a report indicative of a connection quality of the first carrier,
responsive to the receiving of the report indicative of the connection quality of the first carrier, issuing by the device a request for handover of the first carrier towards a second device,
sending by the device a relocation information in relation to the first carrier towards the first other device, and
only after sending that relocation information, commanding by the device the terminal to perform a handover of the first carrier to the second device.

6. A method according to claim 5, further comprising
providing for an interface from the device towards said at least first other device,
measuring an average transport delay for data that are exchanged between the device and said at least first other device via said interface, and
delaying the commanding the terminal after sending the relocation information according to the measured transport delay.

7. A method according to claim 6, wherein measuring the transport delay is based on a Ping procedure directed to an address of a respective first other device.

8. A method according to claim 5, further comprising
including, in said request for handover, information indicative of the first carrier established towards the terminal and of the at least second carrier established towards the terminal from the first other device.

9. An apparatus, comprising:
memory module comprising software code portions; and
a processor, wherein the memory module and the software code portions are configured, with the processor, to cause the apparatus to perform at least the following:
communicating with a terminal in association with at least a first other device, using at least two carriers, wherein at least a first carrier towards the terminal is established and at least a second carrier is established towards the terminal from the first other device;
receiving a report indicative of a connection quality of the first carrier,
responsive to the receiving of the report indicative of the connection quality of the first carrier, issuing a request for handover of the first carrier towards a second device, sending a relocation information in relation to the first carrier towards the first other device,
including, in said request for handover, information indicative of the first carrier established towards the terminal and of the at least second carrier established towards the terminal from the first other device, and
only after sending that relocation information, commanding the terminal to perform a handover of the first carrier to the second device.

10. An apparatus according to claim 9, wherein the memory module and the software code portions are further configured, with the processor, to cause the apparatus to perform at least the following:
measuring an average transport delay for data that are exchanged between the device and said at least first other device via said interface; and
delaying the command to the terminal after sending the relocation information according to the measured transport delay.

11. An apparatus according to claim 10, wherein the memory module and the software code portions are further configured, with the processor, to cause the apparatus to perform at least the following:
measuring transport delay based on a Ping procedure directed to address of a respective first other device.

12. A computer program product comprising a non-transitory computer readable medium bearing computer program code embodied therein for use with a computer, the computer program code comprising:
code for communicating by a device with a terminal in association with at least a first other device, using at least two carriers, wherein at least a first carrier towards the terminal is established from the device and at least a second carrier is established towards the terminal from the first other device;
code for receiving at the device of a report indicative of a connection quality of the first carrier,
code for issuing, responsive to the receiving of the report indicative of the connection quality of the first carrier by the device a request for handover of the first carrier towards a second device,
code for sending by the device a relocation information in relation to the first carrier towards the first other device, and
code for commanding, only after sending that relocation information, by the device the terminal to perform a handover of the first carrier to the second device.

13. A computer program product according to claim 12, further comprising:
code for providing for an interface from the device towards said at least first other device,
code for measuring an average transport delay for data that are exchanged between the device and said at least first other device via said interface, and
code for delaying the commanding the terminal after sending the relocation information according to the measured transport delay.

14. A computer program product according to claim 13, wherein measuring the transport delay is based on a Ping procedure directed to an address of a respective first other device.

15. A computer program product according to claim 12, further comprising
code for including, in said request for handover, information indicative of the first carrier established towards the terminal and of the at least second carrier established towards the terminal from the first other device.

16. A method, comprising:
communicating with a terminal in association with at least a first other device, using at least two carriers, wherein at least a first carrier towards the terminal is established and at least a second carrier is established towards the terminal from the first other device;
receiving a report indicative of a connection quality of the first carrier,
responsive to the receiving of the report indicative of the connection quality of the first carrier issuing a request for handover of the first carrier towards a second device, sending a relocation information in relation to the first carrier towards the first other device,
including, in said request for handover, information indicative of the first carrier established towards the terminal and of the at least second carrier established towards the terminal from the first other device, and
only after sending that relocation information, commanding the terminal to perform a handover of the first carrier to the second device.

17. A method according to claim 16, further comprising
providing for an interface from the device towards said at least first other device,
measuring an average transport delay for data that are exchanged between the device and said at least first other device via said interface, and
delaying the commanding the terminal after sending the relocation information
according to the measured transport delay.

18. A method according to claim 17, wherein measuring the transport delay is based on a Ping procedure directed to an address of a respective first other device.

19. A computer program product comprising a non-transitory computer readable medium bearing computer program code embodied therein for use with a computer, the computer program code comprising:
code for communicating with a terminal in association with at least a first other device, using at least two carriers, wherein at least a first carrier towards the terminal is established and at least a second carrier is established towards the terminal from the first other device;
code for receiving a report indicative of a connection quality of the first carrier,
code for issuing, responsive to the receiving of the report indicative of the connection Quality of the first carrier, a request for handover of the first carrier towards a second device, sending a relocation information in relation to the first carrier towards the first other device,
code for including, in said request for handover, information indicative of the first carrier established towards the terminal and of the at least second carrier established towards the terminal from the first other device, and
code for commanding, only after sending that relocation information, the terminal to perform a handover of the first carrier to the second device.

20. A computer program product according to claim 19, further comprising:
code for providing for an interface from the device towards said at least first other device,
code for measuring an average transport delay for data that are exchanged between the device and said at least first other device via said interface, and
code for delaying the commanding the terminal after sending the relocation information according to the measured transport delay.

* * * * *